June 3, 1924.
W. R. PAGE
1,496,357
ACCELERATOR PEDAL
Filed April 25, 1923
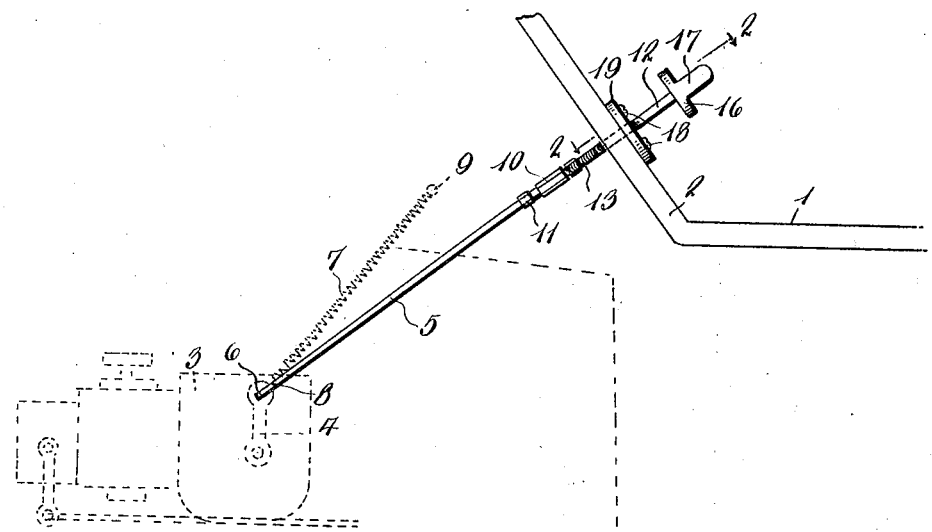
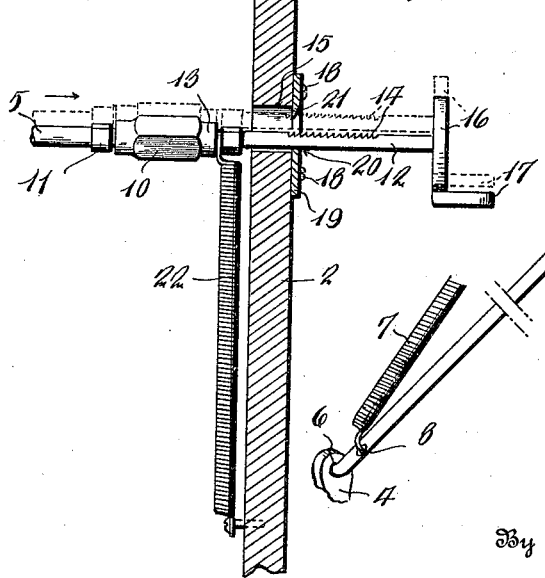
Inventor
William R. Page
By E. H. Bond
Attorney Patented June 3, 1924.

1,496,357

UNITED STATES PATENT OFFICE.

WILLIAM R. PAGE, OF ATLANTIC CITY, NEW JERSEY.

ACCELERATOR PEDAL.

Application filed April 25, 1923. Serial No. 634,529.

*To all whom it may concern:*

Be it known that I, WILLIAM R. PAGE, a citizen of the United States, residing at Atlantic City, in the county of Atlantic and State of New Jersey, have invented certain new and useful Improvements in Accelerator Pedals, of which the following is a specification.

This invention relates to certain new and useful improvements in accelerator pedals for use on automobiles and the like, and it has for its objects among others to provide a simple and cheap, yet efficient and reliable device of this character, readily applied, when desired, to motor vehicles now in use, without the aid of skilled labor or any special construction of or changes in the vehicle.

It has for a further object to provide a novel construction and arrangement of parts whereby the pedal, while normally free for movement to regulate the flow of the gasoline or other fluid, may be easily and quickly manipulated to automatically hold the same at any point and at all times within the control of the driver of the vehicle. The pedal-carrying member or bar is normally held free for reciprocation by pressure on the pedal by the foot of the driver and also normally held in its outermost position by the spring usually employed for such purposes. Inward pressure on the pedal forces the pedal-carrying member inward to increase the flow of gas, against the force of this spring, and when pressure is released the spring immediately forces the pedal member outward. The pedal-carrying member is provided with ratchet teeth which may be engaged with a dog or the like on a member affixed to the dash board of the car, or other support, the said member being normally held out of engagement with such pawl by the action of a spring connected with the said member but when the pedal member is pushed inward and toward the ratchet-engaging tooth or pawl, the latter engages the said teeth and will be there held in any of its adjusted positions by the action of the spring which serves to throw the pedal member outward when such engagement is removed. In order to accomplish this latter movement the pedal is provided with a lug or the like which is designed to be engaged by the foot so that the pedal member may be moved laterally and thus move the same out of engagement with the pawl.

Other objects and advantages of the invention will hereinafter appear and the novel features thereof will be specifically defined by the appended claims.

The invention, in its preferred form, is clearly illustrated in the accompanying drawings, which, with the numerals of reference marked thereon, form a part of this specification, and in which—

Figure 1 is a side elevation showing the application of my invention, the carbureter and other parts being indicated by dotted lines.

Figure 2 is a section on the line 2—2 of Figure 1, on an enlarged scale, looking in the direction of the arrows.

Figure 3 is a perspective detail showing the parts directly involved in my invention.

Like numerals of reference indicate like parts throughout the several views.

Referring to the drawings—

1 designates a portion of the floor and 2 a portion of the dash or instrument board of a motor vehicle.

3, in dotted lines, indicates the carbureter and 4 the control lever thereof, of usual construction. 5 is the rod that is connected at its inner end with the end of this control lever as seen at 6 in Figures 1 and 3.

In Figure 1 the control lever 4 is shown in its closed position. It is thus held by means of the spring 7 attached at one end to the rod 5 as seen at 8 and at its other end as seen at 9 to some relatively fixed part.

The rod 5 at its upper end is shown as connected to the turn-buckle or like member 10, 11 being a lock nut on the said rod, while into the other end of this turn-buckle is screw threaded the inner end of a member 12, a lock nut 13 being provided thereon as seen in Figures 1, 2 and 3. This member 12 is provided along one face with teeth 14 which are undercut, the member 12 preferably having a flat face upon which the said teeth are formed. As seen clearly in Figure 2 this member 12 is designed to slide freely, unless otherwise held, through an opening 15 in the member 2, and at its outer end is provided with a pedal portion 16, which may or may not be integral therewith. This pedal portion is provided with a member 17 extended at substantially right angles to the face of the pedal and toward the driver of the vehicle.

Secured to the member 2 in any suitable manner as by screws or the like 18 is the member 19, in the present instance shown as in the form of a circular plate, though it may be of any other suitable form, and this member 19 has an elongated opening 20 therein of greater length than the dimension of the member 12 as seen clearly in Figures 2 and 3, so that the member 12 may have limited lateral movement therein, the member 19 being so disposed as seen in Figure 2 that this opening 20 extends horizontally and at the right hand side of this opening there is formed from the member 19 a tongue or pawl 21 which is adapted to engage with the teeth of the member 12 and hold the said member against endwise movement when the said member has been moved laterally so that its teeth will engage the said pawl.

22 is a spring secured at one end to some fixed part of the vehicle and at its other end connected with the member 12, in the present instance by the nut 13, but it may be otherwise held.

The operation will be readily understood from the foregoing description when taken in connection with the annexed drawings, and, briefly stated, is a follows;—normally, the parts are in the position in which they are shown by full lines in Figure 2, the pedal being at its outermost limit and the teeth of the member 12 out of engagement with the pawl 21 the spring 7 having forced the pedal to such outermost limit and the spring 22 having pulled it out of its engagement with the pawl. It is to be noted that the spring 22 is a spring of light power so that its only function is to keep the rod 12 moved to the left just sufficiently to keep it out of engagement with the pawl but readily overcome by the force of the spring 7 which latter holds the rod 12 with its teeth in engagement with the pawl, the latter spring being of much greater power than the spring 22. Hence, when the pedal is moved to the right sufficiently to cause the teeth of the rod 12 to be engaged by the pawl the rod will be there held with sufficient force to prevent its disengagement by vibrations of the car, yet the rod can be pushed in from time to time as much as possible or desired to increase the flow of gas. Thus the control lever may be set in any position desired and there left, it not being necessary for the driver to keep his foot on the pedal. When he desires to shut off the gas he simply touches the member 17 with his toe and this disengages the teeth from the pawl and the spring 7 brings the rod 12 to its outermost limit and the spring 22 serves to keep it out of engagement with the pawl.

Modifications in detail may be resorted to without departing from the spirit of the invention or sacrificing any of its advantages.

What is claimed as new is;—

1. An accelerator pedal-carrying member connected with the carbureter control lever and slidably and laterally movable, means directly connected therewith for normally holding the same in inoperative position, and means directly connected with said member for moving the same endwise.

2. A pedal, a rod carrying the same, said pedal having a toe-engaging portion, a plate attachable to some fixed part and having a guide opening for the said rod and a pawl extending into opening to engage the adjacent face of the rod, a spring connected with said rod to hold it out of engagement with said pawl, and a spring of different power acting on the rod to move it outward endwise and to hold the said rod in engagement with the pawl both of said springs being connected directly to said rod.

3. A device of the character desribed comprising a rod having a toothed face, a pedal carried by said rod, a member having a guide opening for said rod and a pawl extending into said opening to engage the teeth of the rod, means for connecting said rod with the carbureter-control lever, and a spring acting on said rod to normally hold the same laterally out of contact with said pawl and a spring of different power for moving the said rod endwise both of said springs being connected directly to said rod.

4. A device of the character described comprising a laterally adjustable rod connectible with the control lever of a carbureter, a spring connected directly with said rod adjacent its connection with the carbureter for moving the rod endwise, a fixed member cooperating with the rod to hold it in its endwise and laterally adjusted positions, and a spring of less power than the first-named spring connected directly to said rod for moving the rod laterally and controlling its engagement with said means.

In testimony whereof I affix my signature.

WILLIAM R. PAGE.